(12) United States Patent
Hoeferlin et al.

(10) Patent No.: US 11,243,311 B2
(45) Date of Patent: Feb. 8, 2022

(54) METHOD AND DEVICE FOR DETERMINING A POSITION OF A MOBILE OBJECT

(71) Applicant: Robert Bosch GmbH, Stuttgart (DE)

(72) Inventors: Benjamin Hoeferlin, Pleidelsheim (DE); Shehabeldin Abdelgawad, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 16/439,104

(22) Filed: Jun. 12, 2019

(65) Prior Publication Data

US 2019/0383948 A1 Dec. 19, 2019

(30) Foreign Application Priority Data

Jun. 13, 2018 (DE) ............ 10 2018 209 432.2

(51) Int. Cl.
*G01S 19/40* (2010.01)
*G01S 19/39* (2010.01)
*G01S 19/22* (2010.01)

(52) U.S. Cl.
CPC ........... *G01S 19/40* (2013.01); *G01S 19/22* (2013.01); *G01S 19/396* (2019.08)

(58) Field of Classification Search
CPC ........ G01S 19/40; G01S 19/22; G01S 19/396; G01S 19/48; G01S 19/42; G01S 19/09; G01S 19/05
USPC .................................................. 342/357.23
See application file for complete search history.

(56) References Cited

U.S. PATENT DOCUMENTS

| | | | |
|---|---|---|---|
| 9,766,349 B1* | 9/2017 | Madhow | G01S 19/11 |
| 2008/0238772 A1 | 10/2008 | Soloviev et al. | |
| 2009/0102707 A1 | 4/2009 | Elwell, Jr. et al. | |
| 2012/0232787 A1* | 9/2012 | Kunath | G01C 21/3697 701/423 |
| 2013/0113647 A1* | 5/2013 | Sentelle | G01S 13/887 342/22 |
| 2014/0253375 A1* | 9/2014 | Rudow | G01S 19/49 342/357.51 |
| 2015/0099473 A1* | 4/2015 | Szini | H04B 17/391 455/67.12 |
| 2016/0043883 A1* | 2/2016 | Zirwas | H04L 25/0206 370/329 |
| 2016/0327650 A1* | 11/2016 | Barnes | G01S 19/11 |
| 2019/0079188 A1* | 3/2019 | Milschewski | G01S 15/46 |
| 2019/0094379 A1* | 3/2019 | Chhokra | G01S 19/40 |
| 2019/0147619 A1* | 5/2019 | Goldman | B64C 39/024 382/154 |

* cited by examiner

*Primary Examiner* — Harry K Liu
(74) *Attorney, Agent, or Firm* — Maginot, Moore & Beck LLP

(57) ABSTRACT

A method for determining, from a plurality of satellites, a position of a mobile object having a reception device configured to receive satellite signals, includes performing a measurement of a plurality of pseudo-distances between the reception device and the plurality of satellites using the satellite signals. The method further includes correcting a result of the measurement using a surroundings model of surroundings of the mobile object to produce at least one corrected pseudo-distance. The surroundings model is indicative of at least one reflection plane of satellite signals.

13 Claims, 2 Drawing Sheets

METHOD AND DEVICE FOR DETERMINING A POSITION OF A MOBILE OBJECT

This application claims priority under 35 U.S.C. § 119 to patent application no. DE 10 2018 209 432.2, filed on Jun. 13, 2018 in Germany, the disclosure of which is incorporated herein by reference in its entirety.

The disclosure is based on an apparatus or a method of the type in question in the claims, description and drawings. The subject of the present disclosure is also a computer program.

BACKGROUND

Calculation of position solutions from GNSS (Global Navigation Satellite System) signals by means of trilateration can be confronted by a path of travel of some received signals not or not exclusively corresponding to a direct line of sight between receiver and transmitter. Such paths of signal travel are usually referred to as multipath propagation, since such signals can arrive at the receiver repeatedly at different times on account of multipath propagation. Current GNSS antenna receiver systems can attempt to reject undesirable signals of this kind, e.g. by means of backshot rejection, choke rings, narrowband correlators, etc., and to filter them out (FDE, fault detection and exclusion), etc. In this case, GNSS systems of this kind can in particular handle multipath effects that arise at a ground plane for the antenna on account of signal reflections.

SUMMARY

Against this background, the approach presented here is used to present a method, furthermore an apparatus that uses this method, and finally a corresponding computer program. The measures listed in the disclosure also describes advantageous developments and improvements of the apparatus.

According to embodiments, it is in particular possible for a position determination or position estimation by using GNSS (Global Navigation Satellite System) signals to be rendered possible even under conditions of a multipath propagation, as can arise in urban canyons in urban settings, for example. In this case, a position correction and Doppler correction, can be made, for example. To correct measured pseudodistances, it is in particular possible for a surroundings model having, merely in exemplary fashion, at least one reflection plane for satellite signals that is orthogonal to an ascertained direction of movement of the mobile object to be used. For position determination, it is also possible, for example in addition to a position solution, for geometries located in surroundings to be approximated or estimated that induce or have induced a multipath propagation. In particular, an equalization calculation on the basis of a measured pseudodistance afflicted by a multipath propagation can optimize both a position of a receiver and the surroundings model.

Advantageously, according to embodiments, a position determination can in particular also take into consideration more difficult scenarios with multipath propagation, as can arise in what are known as urban canyons in city areas, in order to allow a particularly reliable and accurate position determination. In such scenarios with multipath propagation, a direct line of sight to the satellite can sometimes be concealed by a building, and it is possible for a satellite signal to be received only by multipath propagation. In the case of an ordinary multipath propagation, in which a relevant signal is also received via a direct line of sight, it is for example frequently possible for just a slight shift of the pseudodistance or of the time-of-flight distance between transmitter and receiver, including an error as a result of nonsynchronous clocks, to occur on account of a correlation error of the repeatedly received signal. In particular, it is by contrast possible in urban canyon scenarios for many satellites to ascertain only pseudodistances for the multipath propagations. According to embodiments, an accurate position determination can be rendered possible, even if divergences arise between distance measurements to different satellites, and it is also possible for satellites whose signals are affected by the multipath propagation to be incorporated into the solution calculation. Therefore, a reliable position determination, in particular with low geometric reduction in accuracy for the position determination (GDOP, Geometrical Dilution of Precision), can be rendered possible despite a horizon geometry influenced by streets. As such, a correct positional hypothesis can be chosen even in the event of multipath propagation, since for example pseudodistances from satellites with multipath propagation are adopted in the position solution after they have been corrected, and pseudo ranges to satellites for which there is a direct line of sight can be taken into consideration.

A method for determining a position of a mobile object is presented, wherein the mobile object has a reception device for receiving satellite signals from a plurality of satellites, wherein the method comprises the following steps:

performing a measurement of a plurality of pseudodistances between the reception device and the plurality of satellites by using the satellite signals; and correcting a result of the measurement by using a surroundings model of surroundings of the mobile object in order to produce at least one corrected pseudodistance for determining the position of the mobile object, wherein the surroundings model represents at least one reflection plane for satellite signals.

This method can be implemented for example in software or hardware or in a mixed form of software and hardware, for example in a controller. The mobile object can be a vehicle, in particular a land vehicle, for example a motor vehicle in the form of a passenger vehicle or a commercial vehicle. The pseudodistance can be understood to mean a distance between the reception device and a satellite transmitting the satellite signal. If the satellite signal is reflected on the way to the reception device, then the measured pseudodistance may be afflicted by error. Such a pseudodistance afflicted by error can be corrected by using the surroundings model. A surroundings model can be understood to mean a model mapping a shape of the surroundings, for example, said model being estimated and additionally or alternatively approximated, for example. Optionally, the surroundings model can be measured, can be predetermined and can additionally or alternatively be available as a data record. The reflection plane can be understood an area mapped by the surroundings model and assumed to reflect the satellite signal. In this case, the satellite signal can be reflected from the at least one reflection plane at least once. The correction can be made for example by using a distance between the reception device and the reflection plane and additionally or alternatively by using a reflection angle at which the satellite signal is reflected from the reflection plane.

The method can also have a step of carrying out a position determination by using the at least one corrected pseudodistance in order to determine the position of the mobile object. An equation system for the position determination can be overdetermined in this case. By virtue of the corrected pseudodistance being used, the position can be determined very accurately, especially in city areas.

In particular, the correcting step can involve the result of the measurement being corrected by using a surroundings model in which the reflection plane is orthogonal to an ascertained direction of movement of the mobile object. By virtue of in particular reflection areas oriented orthogonally to the direction of movement of the mobile object being taken into consideration, performance of the correction of the pseudodistance can be made very simple. In this case, the method can comprise a step of selecting those reflection areas that are oriented orthogonally to the ascertained direction of movement of the mobile object from the surroundings model.

According to one embodiment, the method can have a step of ascertaining the direction of movement of the mobile object by using a Doppler shift. Additionally or alternatively, the direction of movement can be performed in the ascertaining step by using a tracking of previously determined positions of the mobile object over time. Such an embodiment affords the advantage that ongoing relevant reflection areas can be picked out from the surroundings model and used for correction. An equation for the direction of movement can be overdetermined. This can be used to infer a corrected Doppler shift for a single measurement.

In this case, the ascertaining step can involve the direction of movement of the mobile object being ascertained by using a Doppler shift of at least one satellite signal. Additionally or alternatively, the direction of movement can be ascertained by using a signal transmitted by the mobile object. This allows the direction of movement to be ascertained in unsophisticated, reliable and exact fashion.

The correcting step can also involve the result of the measurement being corrected by using the surroundings model, which further represents a reflection property of the reflection plane in regard to satellite signals. A reflection property can relate to a characteristic relevant for a reflection of a satellite signal from the reflection plane. In this case, the reflection property can map the Brewster angle, for example, or another property. Such an embodiment affords the advantage that the correction of the pseudodistance can be improved still further by virtue of a quality of a surface being able to be mapped in the form of the reflection property of the reflection plane.

Further, the method can have a step of adjusting the surroundings model by using the at least one pseudodistance and additionally or alternatively the at least one corrected pseudodistance. By way of example, this can involve a parameter of the surroundings model being adjusted that can define a position and/or orientation of a reflection plane mapped by the surroundings model, for example. The adjusting step can involve the surroundings model also being created or generated afresh. The adjusting step can be carried out repeatedly. Such an embodiment affords the advantage that the position determination can also involve surroundings geometries and pseudodistances matched to a multipath propagation being approximated, with for example a geometry model or surroundings model being able to be supported by in each case one or more pseudodistance measurements. In particular, supporting pseudodistance measurements of this kind can be adapted, for example shortened by the approximated multipath propagation, on the basis of the surroundings or geometry thus supported, and, accordingly adapted, can be taken into consideration or used for the position determination.

In this case, the adjusting step can involve the surroundings model being adjusted by using at least one stochastic method or optimization method and additionally or alternatively sensor data from at least one sensor of the mobile object. The at least one stochastic method can have an algorithm from the field of regression analysis, for example what is known as the RANSAC algorithm, sequential Monte Carlo methods or particle filters, what is known as dynamic covariance scaling or soft constraints or switchable constraints and additionally or alternatively other stochastic methods. The at least one sensor can be an ambient sensor, an acceleration sensor or another vehicle sensor aboard a vehicle. Such an embodiment affords the advantage that a continuous and accurate adjustment of the surroundings model can be rendered possible. Further, a robustness toward statistical outliers can be increased.

Also, the adjusting step can involve the surroundings model being adjusted by using a tracking of the surroundings model over time. Such an embodiment affords the advantage that the surroundings model can be adjusted even more accurately and more realistically.

It is also possible for the adjusting step to involve a verification of the surroundings model being performed by using sensor data from at least one sensor of the mobile object. In this case, the surroundings model can be adjusted on the basis of a result of the verification. Such an embodiment affords the advantage that a further plausibilization level can be added in order to compare the surroundings model against further observation data for the surroundings and hence to increase a reliability and precision of the surroundings model.

The approach presented here further provides an apparatus designed to perform, actuate or implement the steps of a variant of a method presented here in appropriate devices. This variant embodiment of the disclosure in the form of an apparatus can also achieve the object on which the disclosure is based quickly and efficiently.

To this end, the apparatus can have at least one computing unit for processing signals or data, at least one memory unit for storing signals or data, at least one interface to a sensor or an actuator for reading in sensor signals from the sensor or for outputting data signals or control signals to the actuator, and/or at least one communication interface for reading in or outputting data embedded in a communication protocol. The computing unit can be for example a signal processor, a microcontroller or the like, wherein the memory unit can be a flash memory, an EEPROM or a magnetic memory unit. The communication interface can be designed to read in or output data wirelessly and/or by wire, wherein a communication interface that can read in or output wired data can read in these data from an appropriate data transmission line or can output them to an appropriate data transmission line, for example electrically or optically.

An apparatus can be understood in the present case to mean an electrical device that processes sensor signals and takes these as a basis for outputting control signals and/or data signals. The apparatus can have an interface that can be in hardware and/or software form. In the case of a hardware form, the interfaces can be for example part of what is known as a system ASIC containing a wide variety of functions of the apparatus. However, it is also possible for the interfaces to be separate, integrated circuits or to consist, at least in part, of discrete components. In the case of a software form, the interfaces can be software modules present on a microcontroller besides other software modules, for example.

In an advantageous configuration, the apparatus controls a position determination for a mobile object, in particular a vehicle. To this end, the apparatus can for example access input signals such as satellite signals and sensor signals from at least one sensor of the mobile object. By using the input signals, the apparatus can determine a geographical position of the mobile object by means of stochastic methods and additionally or alternatively by using further sensor signals and can provide said geographical position in the form of an output signal to at least one functional device of the mobile object.

Another advantage is a computer program product or computer program having program code that can be stored on a machine-readable carrier or storage medium such as a semiconductor memory, a hard disk memory or an optical memory and is used for performing, implementing and/or actuating the steps of the method according to one of the embodiments described above, in particular when the program product or program is executed on a computer or an apparatus.

BRIEF DESCRIPTION OF THE DRAWINGS

Exemplary embodiments of the approach presented here are depicted in the drawings and explained more specifically in the description that follows. In the drawings.

DETAILED DESCRIPTION

In the description of advantageous exemplary embodiments of the present disclosure that follows, identical or similar reference signs are used for the elements having a similar action that are depicted in the various figures, with a repeat description of these elements being dispensed with.

Figure 1:
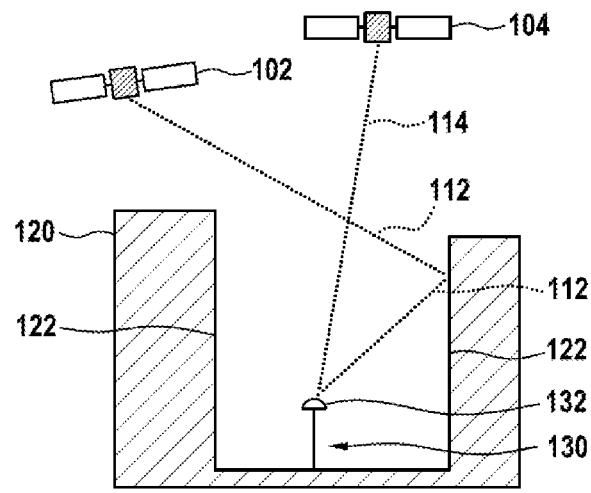
FIG. 1 shows a schematic depiction of reception of satellite signals for position determination for a mobile object having an apparatus according to an exemplary embodiment.

FIG. 1 shows a schematic depiction of reception of satellite signals 112, 114 for position determination for a mobile object 130 according to an exemplary embodiment. This can be accomplished using an apparatus as described in detail below with reference to FIG. 3. In exemplary fashion, two satellites 102, 104 are shown, which are denoted as first satellite 102 and second satellite 104, for example. The first satellite 102 transmits a first satellite signal 112. The second satellite 104 transmits a second satellite signal 114. The mobile object 130 has a reception device 132. The reception device 132 is designed to receive the satellite signals 112, 114. The mobile object 130 is for example a vehicle, in particular a motor vehicle or a commercial vehicle. Alternatively, the mobile object 130 can also be a portable device. The mobile object 130 has the apparatus designed to determine a position of the mobile object 130 by using the satellite signals 112, 114. The apparatus is discussed in even more detail with reference to the figures that follow.

Further, a surroundings model 120 having reflection planes 122 is depicted. The surroundings model 120 represents current surroundings of the mobile object 130. The mobile object 130 is currently arranged in the surroundings mapped by the surroundings model 120. In the depiction of FIG. 1, the surroundings model 120 maps an urban canyon in city surroundings, for example. The reflection planes 122 represent external walls of buildings in this case. The first satellite signal 112 from the first satellite 102 is reflected by one of the reflection planes 122 before being received by the reception device 132. The second satellite signal 114 from the second satellite 104 is received by the reception device 132 directly or in reflection-free fashion or without reflection from a reflection plane 122. Therefore, put another way, FIG. 1 shows an example of a multipath propagation, wherein the first satellite signal 112 is received not via the direct path but rather via a reflection from the reflection plane 122.

Figure 2:
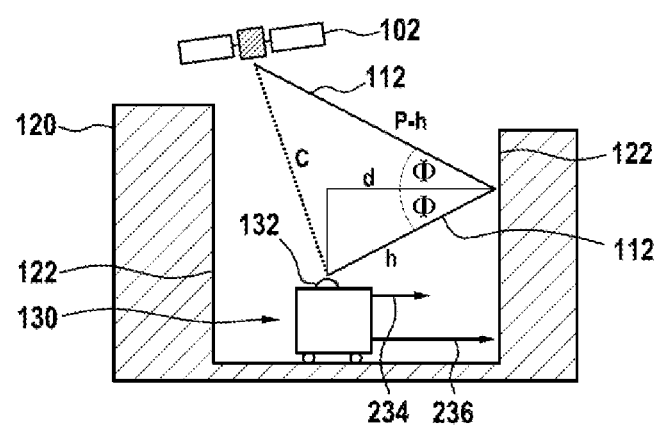
FIG. 2 shows a schematic depiction of reception of a satellite signal for position determination for a mobile object having an apparatus according to an exemplary embodiment.

FIG. 2 shows a schematic depiction of reception of a satellite signal 112 for position determination for a mobile object 130 according to an exemplary embodiment. In this case, the depiction in FIG. 2 corresponds to the depiction from FIG. 1 with the exception that only the first satellite 102 and the first satellite signal 112 are shown and additional details concerning geometry and path of signal travel are entered.

A direct line of sight between the reception device 132 and the first satellite 102 as transmitter is shown as a corrected pseudodistance C or pseudo range C. FIG. 2 shows an example of a determination of the corrected pseudodistance C for the direct line of sight between the reception device 132 and the first satellite 102 on the basis of a measured pseudodistance P for the multipath propagation of the first satellite signal 112, an estimated or approximated distance d from the reflection plane 122, wherein the distance d is the only free parameter of the surroundings model 120 or simplified plane geometry model, and a known angle φ, which is made up of angles of elevation and azimuth and also finds itself being an output angle on the basis of the law of reflection. The first satellite signal 112 is reflected from the reflection plane 122 at the known angle φ. A first distance for the first satellite signal 112 between the first satellite 102 and the reflection plane 122 is denoted by P-h in FIG. 2, wherein a second distance for the first satellite signal 112 between the reflection plane 122 and the reception device 132 is denoted by h.

According to this exemplary embodiment, the mobile object 130 moves and in so doing has a direction of movement 234 oriented orthogonally to the reflection plane 122 from which the satellite signal 112 is reflected. The direction of movement 234 is for example by using a Doppler shift of the satellite signal 112. The direction of movement cannot be ascertained directly from a Doppler shift (compression or expansion of the satellite signal 112) in this case, even if the multipath correction has already been included, since only the vector component of the Doppler is therefore known, but not the other components, of the 2D or 3D translation. Therefore, the measured Doppler remains unaltered on the satellite signal 112. Additionally or alternatively, the direction of movement 234 is ascertained by using an evaluation of a Doppler shift of a signal 236 transmitted by the mobile object 130 object. Such a signal 236 is used for example for a distance measurement e.g. using lidar or the like. In this case, the ascertaining of the direction of movement 234 works if the global orientation of the direction of movement 234 is known beforehand. For example a type of compass, that is to say not only rotation rates of an inertial sensor system, is used for this, since the measurement of the direction of movement by means of multiple GNSS Dopplers are expressed in an Earth-referenced coordinate system (for the most part WGS84) on account of the system design.

The reflection plane 122 oriented orthogonally to the direction of movement 234 is suitable for correcting the measured pseudodistance P, as described below with reference to FIG. 3. The geometric relationships described with reference to FIG. 2 can be used for the correction, in order to ascertain the corrected pseudodistance C.

Figure 3:
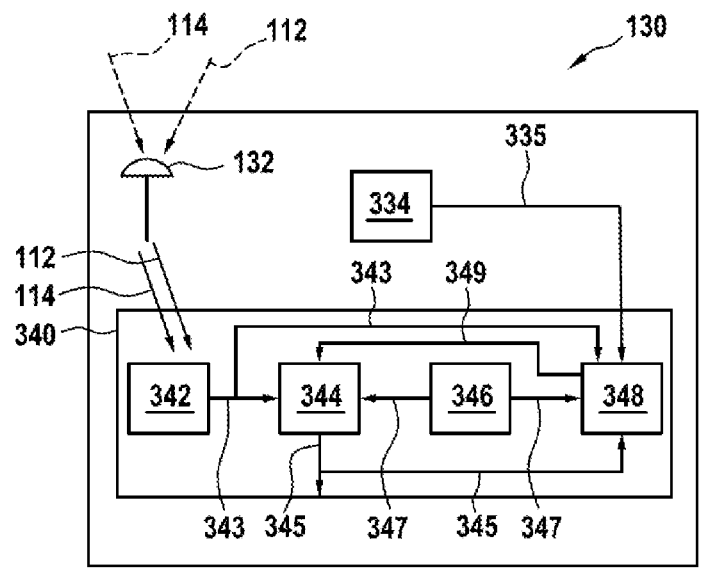
FIG. 3 shows a schematic depiction of a mobile object having an apparatus according to an exemplary embodiment.

FIG. 3 shows a schematic depiction of a mobile object 130 having an apparatus 340 according to an exemplary embodiment. The mobile object 130 in this case corresponds or is similar to the mobile object from one of the figures described above. Therefore, the mobile object 130 is for example a vehicle, in particular a passenger vehicle or a commercial vehicle, or is a portable device.

The mobile object 130 has the reception device 132 for receiving the satellite signals 112, 114 and the apparatus 340. The apparatus 340 is designed to determine a position or geographical position of the mobile object 130 and can therefore also be referred to as a determination apparatus. The reception device 132 and the apparatus 340 are connected to one another so as to be able to transmit signals. According to the exemplary embodiment depicted in FIG. 3, the mobile object 130 optionally further has at least one sensor 334. The depiction of FIG. 3 merely shows a sensor 334 of the mobile object 130 in exemplary fashion. The sensor 334 and the apparatus 340 are connected to one another so as to be able to transmit signals.

The apparatus 340 is designed to read in the satellite signal 112, 114 from the reception device 132 or an interface to the reception device 132. The apparatus 340 has a performance device 342 and a correction device 344.

The performance device 342 is designed to perform a measurement for a plurality of pseudodistances between the reception device 132 and the plurality of satellites by using the satellite signals 112, 114. Further, the performance device 342 is designed to provide a measurement signal 343 representing a result of the measurement.

The correction device 344 is designed to read in or receive the measurement signal 343. The correction device 344 is also designed to correct the result of the measurement, that is to say for example lengths of the measured pseudodistance, by using a surroundings model of surroundings of the mobile object 130 and to produce a corrected pseudodistance for determining the position of the mobile object 130. The surroundings model represents at least one reflection plane for satellite signals, wherein, according to the exemplary embodiment presented here, the reflection plane is orthogonal to an ascertained direction of movement of the mobile object 130. The correction performed by the correction device 344 is performed by using the geometric relationships described with reference to FIG. 2, for example.

Further, the correction device 344 is designed to output or provide a correction signal 345 representing the corrected pseudodistance produced, that is to say for example a corrected length of the pseudodistance. The apparatus 340 is designed to determine the position of the mobile object 130 by using the correction signal 345 and possibly further pseudodistances associated with further satellite signals 112, 114.

According to the exemplary embodiment presented here, the apparatus 340 also has an ascertainment device 346 for ascertaining the direction of movement of the mobile object 130 by using a Doppler shift. In this case, the ascertainment device 346 according to one exemplary embodiment is designed to ascertain the direction of movement of the mobile object 130 by using a Doppler shift of at least one satellite signal 112, 114. Additionally or alternatively, the ascertainment device 346 is designed to ascertain the direction of movement of the mobile object 130 by using a signal transmitted by the mobile object 130, for example a radar signal or ultrasonic signal. Further, the ascertainment device 346 is designed to output or provide a movement signal 347 representing the ascertained direction of movement of the mobile object 130. In this case, the correction device 344 is designed to read in or to receive and use the movement signal 347. According to one exemplary embodiment, the ascertainment device 346 is designed to ascertain the direction of movement of the mobile object 130 by using previously determined positions of the mobile object 130, that is to say by tracking the positions of the mobile object 130 over time.

According to the exemplary embodiment presented here, the apparatus 340 further has an adjustment device 348 for adjusting the surroundings model by using the at least one pseudodistance and/or the at least one corrected pseudodistance. In this case, the adjustment device 348 is designed to adjust or create the surroundings model for the first time and/or to continuously adjust the surroundings model or to continue to bring it more into line with the surroundings. The adjustment device 348 is designed to output or provide a model signal 349 representing the adjusted surroundings model. The correction device 344 is designed to read in or to receive and use the model signal 349.

According to one exemplary embodiment, the adjustment device 348 is designed to adjust the surroundings model by using at least one stochastic method and/or sensor data 335 from the at least one sensor 334 of the mobile object 130. Therefore, the adjustment device 348 is optionally designed to receive or read in the sensor data 335 from the sensor 334. The sensor 334 is for example an ambient sensor of the mobile object 130 using a detection principle based on Doppler radar, lidar, laser or the like. Optionally, the adjustment device 348 is designed to read in or to receive and use the movement signal 347 from the ascertainment device 346.

According to one exemplary embodiment, the adjustment device 348 is additionally or alternatively designed to adjust the surroundings model by using a tracking of the surroundings model over time. According to one exemplary embodiment, the adjustment device 348 is additionally or alternatively designed to perform a verification of the surroundings model by using the sensor data 335 from the sensor 334. In this case, the adjustment device 348 is designed to adjust the surroundings model on the basis of a result of the verification.

In particular, the adjustment device 348 according to one exemplary embodiment is also designed to adjust the surroundings model such that the surroundings model represents at least one reflection property of the reflection plane in regard to the satellite signals 112, 114. In this case, the correction device 344 is designed to correct the result of the measurement by using such a surroundings model.

Figure 4:
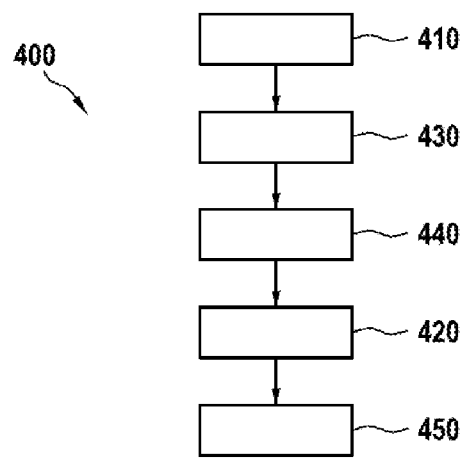
FIG. 4 shows a flowchart for a determining method according to an exemplary embodiment.

FIG. 4 shows a flowchart for a determining method 400 according to an exemplary embodiment. The method 400 is able to be carried out in order to determine a position of a mobile object. In this case, the determining method 400 is able to be carried out in conjunction with a mobile object that has a reception device for receiving satellite signals from a plurality of satellites. The determining method 400 is able to be carried out in conjunction with or by using the apparatus from FIG. 3 or a similar apparatus or the mobile object from one of the figures described above or a similar mobile object.

In the determining method 400, a performing step 410 involves a measurement for a plurality of pseudodistances between the reception device and the plurality of satellites being performed by using the satellite signals. Further, in the determining method 400, a correcting step 420 involves a result of the measurement being corrected by using a surroundings model of surroundings of the mobile object, in order to produce at least one corrected pseudodistance for determining the position of the mobile object. The surroundings model represents at least one reflection plane for satellite signals.

According to one exemplary embodiment, the determining method 400 also has a step 430 of ascertaining the direction of movement of the mobile object by using a Doppler shift and/or a tracking of previously determined positions of the mobile object over time. In this case, the ascertaining step 430 is able to be carried out before the correcting step 420.

According to one exemplary embodiment, the determining method 400 also has a step 440 of adjusting the surroundings model by using the at least one pseudodistance and/or the at least one corrected pseudodistance. In this case, the adjusting step 440 is able to be carried out before the correcting step 420.

In a step 450, the position of the mobile object is determined by using the corrected pseudodistance. In this case, it is possible to resort to known methods for position determination by using one or more pseudodistances, as are used in connection with satellite-assisted methods, for example.

At least some of the steps of the determining method 400 are able to be carried out repeatedly or in cyclic repetition in this case. An order for the performing step 410, the ascertaining step 430, the adjusting step 440 and the determining step 450 can differ from the order depicted in FIG. 4 in this case.

Exemplary embodiments are explained and/or briefly presented again in summary below with reference to the preceding described figures.

In the case of the determining apparatus 340 or method 400, a homogeneous geometry model is used or different geometry models are used as surroundings model 120. These models can be of arbitrarily complex configuration. In a simple variant—used here in exemplary fashion—a plane model is used. These plane geometries can be simplified further in some use scenarios, e.g. vertical planes or reflection planes 122 with a plane normal Orthogonal) to the direction of movement of the receiver or mobile object 130. The latter variant approximates a geometry that frequently arises in urban canyons, and merely requires measurement of the direction of movement of the mobile object 130, e.g. by means of tracking of the position over time or by measuring a speed vector by means of Doppler or other sensors. An example of such a surroundings model 120 and of variables necessary for producing the corrected pseudodistance measurements is provided in exemplary fashion in FIG. 2. According to one exemplary embodiment, in addition to pure geometry models, a quality or a material of the objects on which the geometry models are based and the resultant parameters of different physical effects are also approximated or ascertained, e.g. Brewster angle and/or the like.

Support for a geometry by means of a pseudodistance measurement and the association and correction thereof can be decided in different ways. Inter alia, it is possible for randomized methods, such as RANSAC, to be used here, or an association and solution optimum from a combinational point of view are sought. It should be mentioned that a pseudodistance measurement does not necessarily have to be considered as multipath propagation and therefore does not necessarily need to be considered to be influenced by a geometry model.

According to one exemplary embodiment, what are known as "Switchable Constraints" or "Soft Constraints" are used as stochastic methods in order to choose the best suited multipath propagation for an individual pseudodistance measurement within an optimization. In this case, for example all the possible or useful combinations of multipath propagations on the surroundings models 120 under consideration can be estimated in the optimization and one of them can be chosen by means of connected "Switchable Constraints". Alternatively, it is also possible for multiple hypotheses to be estimated and if need be tracked, e.g. by means of sequential Monte Carlo methods or a particle filter.

The target function and formulation of the optimization or of a filter approach for such a position solution can be made up of multiple weighted factors and regularization terms, the following subaspects, inter alia, possibly being useful: residue of the pseudodistances for the position solution, number of estimated geometries, residues of the geometry solutions.

According to one exemplary embodiment, what are known as "Switchable Constraints" are used as stochastic methods, in order to remove the outliers—not explainable by the multipath propagation geometry model—in the position solution. According to a further exemplary embodiment, in particular multiple reflections from the estimated geometry models or from the reflection planes 122 of the surroundings model 120 are also taken into consideration. According to one exemplary embodiment, the estimated geometry models or the surroundings model 120 is/are tracked over time and validated and if need be used in a sliding window pose graph optimization to calculate an even more accurate position solution. According to a further exemplary embodiment, the estimated geometry models or the surroundings model 120 is/are verified on the basis of the sensor data 335, e.g. lidar, radar or other measurements, or estimated on the basis of such measurements a priori.

If an exemplary embodiment comprises an "and/or" conjunction between a first feature and a second feature, this must be read as meaning that the exemplary embodiment has, according to one embodiment, both the first feature and the second feature and, according to a further embodiment, either only the first feature or only the second feature.

The invention claimed is:

1. A method for determining a position of a mobile object, the mobile object having a reception device configured to receive satellite signals from a plurality of satellites, the method comprising:
   ascertaining a direction of movement of the mobile object;
   identifying a plane, normal of a reflection plane for satellite signals, that is orthogonal to the ascertained direction of movement of the mobile object, in a surroundings model of surroundings of the mobile object;
   determining a plurality of pseudodistances between the reception device and the plurality of satellites using the satellite signals; and
   correcting at least one of the determined plurality of pseudodistances using the identified plane in the surroundings model of surroundings of the mobile object to produce at least one corrected pseudodistance for determining the position of the mobile object.

2. The method according to claim 1, further comprising: determining the position of the mobile object using the at least one corrected pseudodistance.

3. The method according to claim 1, further comprising:
ascertaining the direction of movement of the mobile object using one or more of a Doppler shift and a tracking of previously determined positions of the mobile object over time.

4. The method according to claim 3, wherein the direction of movement of the mobile object is ascertained using a Doppler shift of one or more of at least one satellite signal and a signal transmitted by the mobile object.

5. The method according to claim 1, wherein the surroundings model is further indicative of a reflection property of the reflection plane with regard to satellite signals.

6. The method according to claim 1, further comprising:
adjusting the surroundings model using one or more of the determined plurality of pseudodistances, and the at least one corrected pseudodistance.

7. The method according to claim 6, wherein the surroundings model is adjusted using one or more of at least one stochastic method and sensor data from at least one sensor of the mobile object.

8. The method according to claim 6, wherein the surroundings model is adjusted using a tracking of the surroundings model over time.

9. The method according to claim 6 wherein adjusting the surroundings model includes:
performing a verification of the surroundings model using sensor data from at least one sensor of the mobile object; and
adjusting the surroundings model with reference to a result of the verification.

10. An apparatus configured to one or more of carry out and actuate the steps of the method of claim 1.

11. The method according to claim 1, wherein the method is one or more of carried out and actuated by a computer program.

12. The apparatus of claim 10, comprising:
a non-transitory machine-readable storage medium; and
a computer program stored on the non-transitory machine-readable storage medium, and configured to one or more of carry out and actuate the method when executed by a computing unit.

13. A method for determining a position of a mobile object, the mobile object having a reception device configured to receive satellite signals from a plurality of satellites, the method comprising:
determining a plurality of pseudodistances between the reception device and the plurality of satellites using the satellite signals;
correcting at least one of the determined plurality of pseudodistances using a surroundings model of surroundings of the mobile object to produce at least one corrected pseudodistance for determining the position of the mobile object, wherein the surroundings model is indicative of at least one reflection plane for satellite signals; and
adjusting the surroundings model using one or more of the determined plurality of pseudodistances, and the at least one corrected pseudodistance.

* * * * *